(12) United States Patent
Marin et al.

(10) Patent No.: US 9,162,912 B2
(45) Date of Patent: Oct. 20, 2015

(54) WATER PURIFIER

(75) Inventors: Adriano Marin, Este (IT); Andrea Benetello, Padua (IT)

(73) Assignee: WOW TECHNOLOGY S.P.A., Padua (IT)

( * ) Notice: Subject to any disclaimer, the term of this patent is extended or adjusted under 35 U.S.C. 154(b) by 639 days.

(21) Appl. No.: 13/266,092

(22) PCT Filed: May 26, 2010

(86) PCT No.: PCT/IB2010/052342
§ 371 (c)(1),
(2), (4) Date: Oct. 24, 2011

(87) PCT Pub. No.: WO2010/136982
PCT Pub. Date: Dec. 2, 2010

(65) Prior Publication Data
US 2012/0055857 A1    Mar. 8, 2012

(30) Foreign Application Priority Data
May 26, 2009   (IT) .............................. MI2009A0925

(51) Int. Cl.
| C02F 1/68 | (2006.01) |
| C02F 1/00 | (2006.01) |
| C02F 9/00 | (2006.01) |
| C02F 1/04 | (2006.01) |
| C02F 1/14 | (2006.01) |

(52) U.S. Cl.
CPC ................. *C02F 9/005* (2013.01); *C02F 1/004* (2013.01); *C02F 1/04* (2013.01); *C02F 1/68* (2013.01); *C02F 1/047* (2013.01); *C02F 1/14* (2013.01); *C02F 9/00* (2013.01); *C02F 2001/007* (2013.01); *C02F 2303/10* (2013.01); *Y02W 10/30* (2015.05)

(58) Field of Classification Search
None
See application file for complete search history.

(56) References Cited

U.S. PATENT DOCUMENTS

| 1,485,452 | A | * | 3/1924 | Dovel | ............................ | 210/322 |
| 3,133,130 | A | * | 5/1964 | Lambeth | ........................ | 261/123 |
| 3,674,145 | A | * | 7/1972 | Schmutzler et al. | .......... | 210/801 |
| 4,481,080 | A | * | 11/1984 | Mallon | .......................... | 208/409 |
| 4,793,926 | A | * | 12/1988 | Vion | ............................. | 210/521 |
| 5,049,278 | A | * | 9/1991 | Galper | .......................... | 210/521 |
| 5,397,472 | A | * | 3/1995 | Bouchard | ..................... | 210/519 |

(Continued)

FOREIGN PATENT DOCUMENTS

| FR | 2741870 | 6/1997 |
| GB | 2400603 | 10/2004 |
| GB | 2428196 | 1/2007 |

*Primary Examiner* — Robert James Popovics
(74) *Attorney, Agent, or Firm* — Brannen Law Office, LLC

(57) ABSTRACT

The present invention relates to a water purifier having a non-drinkable water inlet (I) and a drinkable water outlet (O1), and comprising at least a boiler (8) having a water inlet and a steam outlet, a fluids separating filter (5) operating by flow and float, having an inlet and an outlet, and a heat exchanger (4) adapted to exchange heat between a first and a second separated fluid flows, having an inlet and an outlet for a first water flow to be heated as well as an inlet and an outlet for a second water flow to be cooled; the non-drinkable water inlet (I) is coupled to the first flow inlet of the heat exchanger (4), the first flow outlet of the heat exchanger (4) is coupled to the inlet of the fluids separating filter (5), the outlet of the fluids separating filter (5) is coupled to the inlet of the boiler (8), the outlet of the boiler (8) is coupled to the second flow inlet of the heat exchanger (4), the second flow outlet of the heat exchanger (4) is coupled to the drinkable water outlet (O1).

17 Claims, 2 Drawing Sheets

(56) References Cited

U.S. PATENT DOCUMENTS

| | | | |
|---|---|---|---|
| 5,435,914 A * | 7/1995 | Bernhardt | 210/220 |
| 5,628,904 A * | 5/1997 | Bean | 210/602 |
| 6,419,821 B1 * | 7/2002 | Gadgil et al. | 210/86 |
| 6,464,884 B1 * | 10/2002 | Gadgil | 210/748.11 |
| 6,495,049 B1 * | 12/2002 | Van Esch | 210/709 |
| 6,602,425 B2 * | 8/2003 | Gadgil et al. | 210/744 |
| 6,803,587 B2 * | 10/2004 | Gadgil et al. | 250/434 |
| 6,974,958 B2 * | 12/2005 | Gadgil et al. | 250/434 |
| 7,087,157 B2 * | 8/2006 | Spani | 210/96.1 |
| 7,217,933 B2 * | 5/2007 | Gadgil et al. | 250/423 R |
| 7,438,799 B2 * | 10/2008 | Vandenbelt et al. | 210/85 |
| D590,202 S * | 4/2009 | Gadgil et al. | D7/339 |
| 7,837,865 B2 * | 11/2010 | Wadstrom | 210/85 |
| 8,142,652 B2 * | 3/2012 | Wadstrom | 210/175 |
| 9,000,000 B2 * | 4/2015 | Carroll | 210/95 |
| 2002/0113022 A1 * | 8/2002 | Gadgil et al. | 210/748 |
| 2005/0005772 A1 | 1/2005 | Spani | |
| 2005/0092931 A1 * | 5/2005 | Gadgil et al. | 250/434 |
| 2006/0192136 A1 * | 8/2006 | Gadgil et al. | 250/432 R |
| 2012/0055857 A1 * | 3/2012 | Marin et al. | 210/97 |

* cited by examiner

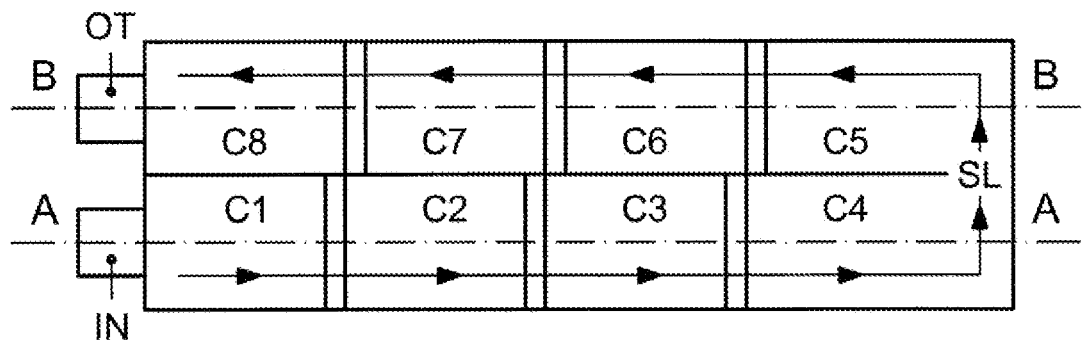
Fig. 2A
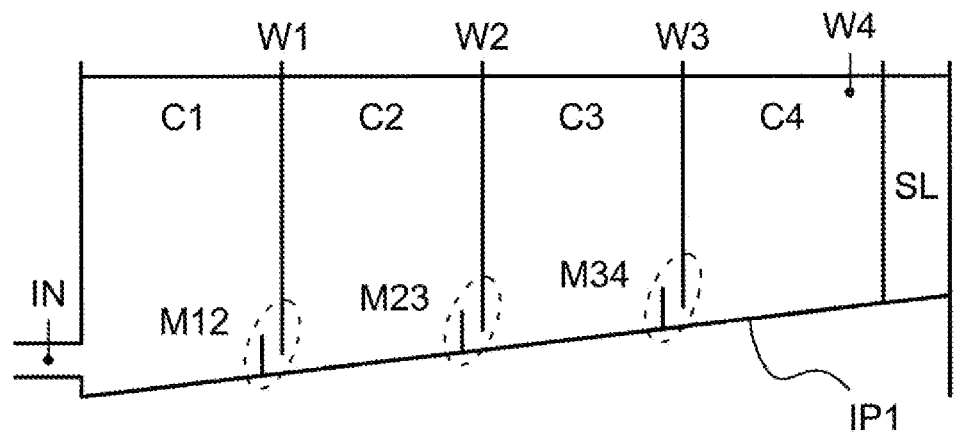
A-A    Fig. 2B
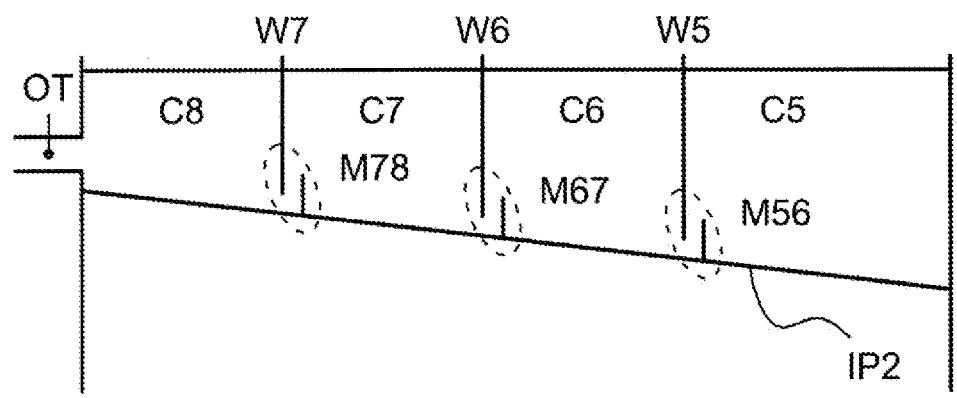
B-B    Fig. 2C

WATER PURIFIER

This application is being filed in the United States for the national phase of international application number PCT/IB2010/052342 filed on 26 May 2010 (publication number WO 2010/136982 A2), claiming priority on prior application MI2009A000925 filed in Italy on 26 May 2009, the contents of each being hereby incorporated herein by reference.

FIELD OF THE INVENTION

The present invention relates to a water purifier, i.e. an apparatus that receives non-drinkable water at the inlet and provides drinkable water at the outlet.

BACKGROUND ART

There are many natural sources of water in the world (rivers, ponds, lakes, seas, springs, surface and underground water tables, rain, . . . ), but the water coming from these natural sources is generally non-drinkable; moreover, growing environmental pollution makes the water of these natural sources increasingly less drinkable.

The majority of countries in the world have artificial water sources, i.e. public and private water distribution networks, but the water coming from these artificial sources is not always drinkable or truly drinkable (this is often the situation in some regions of countries such as Brazil, Russia, India, China, . . . ).

Non-drinkable water can contain, for example, large (gravel) and small (sand) solid particles, heavy metals, hydrocarbons, fertilizers, detergents, acids, ammonia, hydrazine, bacteria, microbes, viruses, . . . ; depending on the circumstances, one or more of these elements can be present. To make non-drinkable water drinkable the undesirable elements present must be removed.

Although there are various types of water purifiers on the market, none of these are completely satisfactory.

The Applicant has carefully studied water purifiers and has reached the following conclusions.

A first desirable feature for a water purifier is that it is capable of removing all possible undesirable elements or at least a high percentage thereof; in fact, it is not easy to predict which undesirable elements will be present in the water coming from a water source; moreover, the undesirable elements may vary in time.

A second desirable feature for a water purifier is that it is capable of completely or almost completely removing the undesirable elements, i.e. that the residual quantity thereof is extremely low.

A third desirable feature for a water purifier is that it is capable of removing the undesirable elements using only a small amount of energy or, in other words, that uses energy (in general this is electric energy) in a very efficient way; in fact, energy is required to remove the undesirable elements.

A fourth desirable feature for a water purifier is that it has a low running cost, and in particular that it requires few and inexpensive consumable materials; it would be ideal for there to be no consumable materials.

A fifth desirable feature for a water purifier is that it is easy to maintain, in particular to wash.

A sixth desirable feature for a water purifier is that it is of simple structure and construction and therefore of limited cost.

A seventh desirable feature for a water purifier, in certain situations, is that it is capable of operating without being connected to a powerful source of electric energy and, more specifically, that it is able to operate only or almost only using solar energy; in fact, in many situations in which there is no drinkable water there is also no public or private electric energy distribution network.

SUMMARY OF THE INVENTION

The object of the present invention is to provide a water purifier that overcomes the drawbacks of prior art and, more in particular, which has the features listed above.

This object has been achieved through a water purifier having the features set forth in the appended claims which form an integral part of the present description.

In general, a water purifier according to the present invention has a non-drinkable water inlet and a drinkable water outlet and comprises at least:
 a boiler (e.g., electric, solar or combustion) having a water inlet and a steam outlet,
 a first fluids separating filter operating by flow and float, having an inlet and an outlet, and
 a first heat exchanger adapted to exchange heat between a first and a second separated fluid flows, having an inlet and an outlet for a first water flow to be heated as well as an inlet and an outlet for a second water flow to be cooled;

the non-drinkable water inlet is coupled to the first flow inlet of the first heat exchanger, the first flow outlet of the first heat exchange is coupled to the inlet of the first fluids separating filter, the outlet of the first fluids separating filter is coupled to the inlet of the boiler, the outlet of the boiler is coupled to the second flow inlet of the first heat exchanger, the second flow outlet of the first heat exchanger is coupled to the drinkable water outlet.

The water purifier according to the present invention can also comprise an input tank adapted to receive non-drinkable water from the non-drinkable water inlet; this input tank has an outlet coupled to the first flow inlet of the first heat exchanger; this outlet is preferably raised from the bottom of the tank and/or associated with a meandrous path.

The water purifier according to the present invention can also comprise a mechanical filter arranged between the non-drinkable water inlet and the first flow inlet of the first heat exchanger; this mechanical filter comprises at least one wall having a plurality of small holes or pores; this wall is preferably made of porous paper.

The water purifier according to the present invention can further comprise a second heat exchanger adapted to exchange heat between a first and a second separated fluid flows, having an inlet and an outlet for a first water flow to be heated, and an inlet and an outlet for a second water flow to be cooled; the outlet of the first fluids separating filter is coupled to the first flow inlet of the second heat exchanger, the first flow outlet of the second heat exchanger is coupled to the inlet of the boiler, the outlet of the boiler is coupled to the second flow inlet of the second heat exchanger, the second flow outlet of the second heat exchanger is coupled to the drinkable water outlet.

The water purifier according to the present invention can comprise a fluid flow cooling device having an inlet and an outlet for the fluid flow; this inlet is coupled to the second flow outlet of the first heat exchanger and this outlet is coupled to the drinkable water outlet.

The water purifier according to the present invention can further comprise a second fluids separating filter operating by flow and float, having an inlet and an outlet; the inlet of the second fluids separating filter is coupled to the second flow outlet of the first heat exchanger and the outlet of the second fluids separating filter is coupled to the drinkable water outlet.

The water purifier according to the present invention can further comprise at least one hydraulic device chosen from a group comprising a device for adding mineral salts, a device for adding carbon dioxide, a device for adding solid or liquid substances, a refrigerating device, an output tank; this/these hydraulic device/s is/are arranged immediately upstream of the drinkable water outlet.

The water purifier according to the present invention can further comprise one or more electric devices (these electric devices are adapted in particular to control fluid flows in the water purifier) and photovoltaic solar cells or a wind electric generator electrically coupled to these electric devices for the purpose of supplying electric power thereto.

In general, the water purifier will comprise electric devices, such as electric pumps and electric valves, and electronic devices, such as an electronic control unit of the water purifier adapted to control these electric devices (the electronic control unit will typically be a microprocessor/microcontroller); photovoltaic solar cells (or a wind electric generator) can advantageously be used to power all these electric and electronic devices; batteries or electric accumulators can be present in the water purifier to guarantee the power supply to all these electric and electronic devices even when there is no or little sunlight (or wind); these electric accumulators can be recharged through the photovoltaic solar cells via an optional electric charging circuit.

The water purifier according to the present invention can further comprise a hydraulic circuit connected to the first fluids separating filter, and adapted to provide heating of the first fluids separating filter; this heating is in particular provided at selected times, preferably at the beginning of the operation of the water purifier.

The water purifier according to the present invention can further comprise a hydraulic circuit adapted to prevent water from flowing out through said drinkable water outlet at selected times, preferably at the beginning of the operation of the water purifier.

The boiler of the water purifier according to the present invention can be adapted to operate, i.e. to boil the water received from the inlet, by means of solar energy; according to the embodiments of the present invention, the radiant energy coming from the sun can heat the water in the boiler directly or can heat a fluid (heat carrier), preferably non-toxic, such as glycol, which in turn heats the water in the boiler; in the case of the present invention, propylene glycol is preferable to ethylene glycol as the former is non-toxic and would not cause serious problems even if it were to accidentally come into contact with the water.

One or each fluids separating filter of the water purifier according to the present invention can comprise a plurality of chambers separated from one another by walls and hydraulically connected in series by means of meandrous paths in lower areas of the chambers; the bottom of these chambers is preferably inclined.

In the present description and in particular in the preceding paragraphs and in the claims, the term "couple" means "to connect directly or indirectly from a hydraulic point of view".

BRIEF DESCRIPTION OF THE FIGURES

The present invention will be more apparent from the description below to be considered together with the accompanying drawings wherein:

FIG. 2 shows, according to three different views (FIG. 2A is a top view, FIG. 2B is a vertical sectional view according to the section A-A, FIG. 2C is a vertical sectional view according to the section B-B), an embodiment of a fluids separating filter operating by flow and float that can be used in the water purifier according to the present invention.

Figure 1:
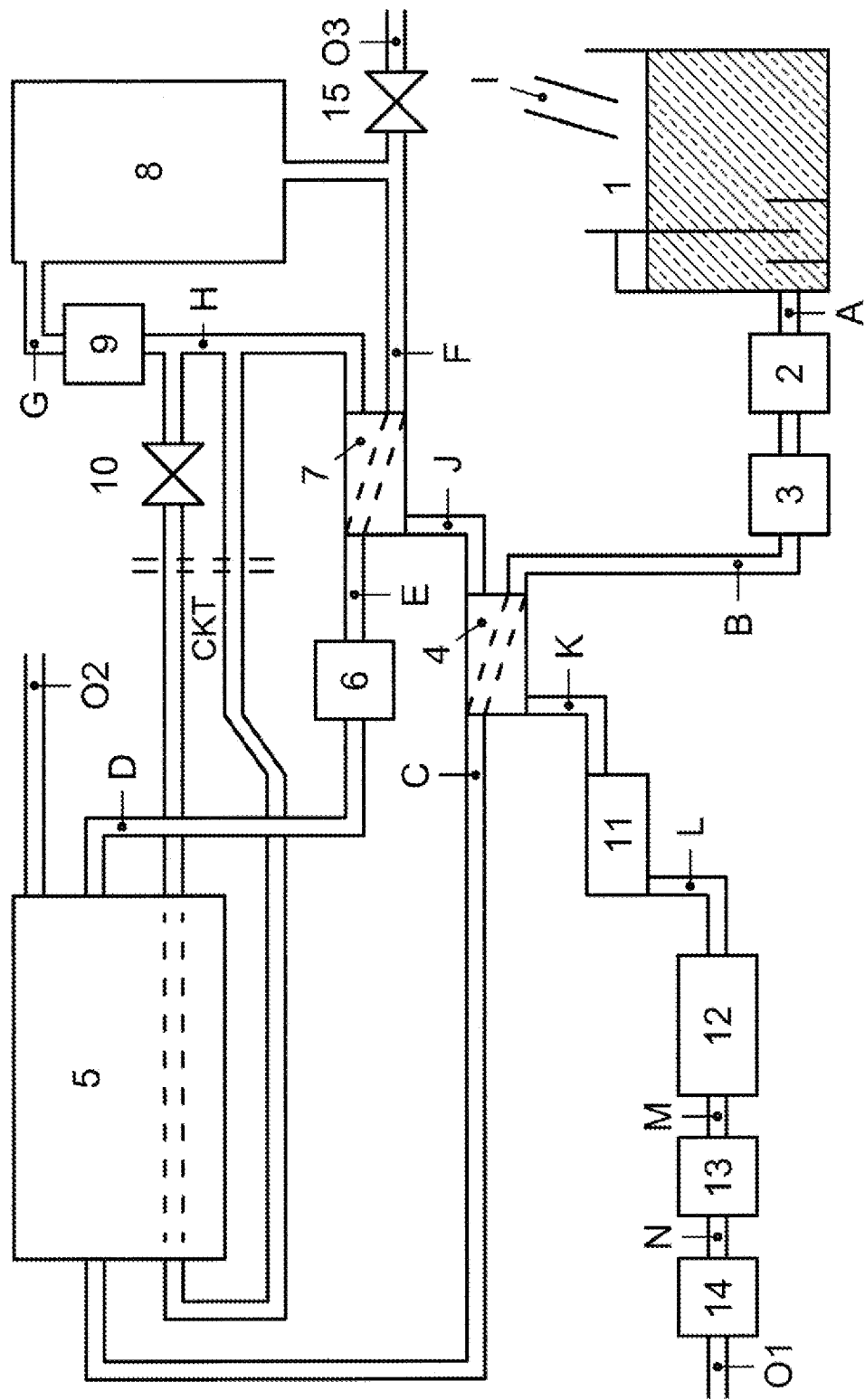
FIG. 1 shows the block diagram of an embodiment of a water purifier according to the present invention.

This description and these drawings are provided by way of non-limiting examples; moreover, they are schematic and simplified.

DETAILED DESCRIPTION OF THE INVENTION

The water purifier of FIG. 1 has a non-drinkable water inlet I and a drinkable water outlet O1 and comprises the following components:

an input tank 1 for non-drinkable water that receives the water directly from the inlet I and is adapted to accumulate a certain quantity of water to be made drinkable by means of the water purifier; this tank is a box-shaped vessel (easily washable) and is provided with an outlet arranged in the lower area thereof, but slightly raised from the bottom thereof; this tank is divided into two chambers by a vertical wall that is interrupted in the lower area of the tank in a manner such that the two chambers are in mutual communication; at this interruption there are two barriers respectively in the two chambers that extend from the bottom of the tank in a manner such as to produce a meandrous path;

a mechanical filter 2 having an inlet and an outlet; this filter comprises one or more walls having a plurality of small holes or pores through which the water can flow; at least one wall can be made, for example, of a sheet of stainless steel in which a plurality of small holes have been produced; alternatively, or additionally, at least one wall can be made, for example, of a sheet of porous paper;

an electric pump 3 having an inlet and an outlet; this pump can be of the circulation or vibration type;

a heat exchanger 4 adapted to exchange heat between a first and a second separated fluid flows and having an inlet and an outlet for a first water flow to be heated as well as an inlet and an outlet for a second water flow to be cooled; this heat exchanger can, for example, be of the type with concentric tubes;

a first fluids separating filter 5 operating by flow and float, having an inlet and an outlet; the volatile elements present in the water are delivered from the filter in gaseous phase—this filter can be supplied with a drain O2 (e.g., of the overflow type) for the light liquids separated from the water through this filter; further details regarding this filter will be provided below during the description of an embodiment thereof with reference to FIG. 2;

an electric pump 6 having an inlet and an outlet; this pump can be of the circulation or vibration type;

a heat exchanger 7 adapted to exchange heat between a first and a second separated fluid flows and having an inlet and an outlet for a first water flow to be heated as well as an inlet and an outlet for a second water flow to be cooled; this heat exchanger can, for example, be of the type with concentric tubes;

a boiler 8 having a water inlet and a steam outlet; this boiler is preferably an easily washable vessel (e.g., made of Teflon) inside which the water is heated to boiling point—boiling generates steam which flows out through the boiler outlet; this boiler is advantageously provided with sensors to detect the level of water therein (in fact, it is greatly preferable for the boiler always to contain a large quantity of liquid water, preferably at the same predetermined level or in an interval of predetermined levels) and the pressure of the steam and the temperature of the water; heating can be produced by means of electric resistors or by means of a hydraulic pipe (e.g., a coil) through which a hot fluid flows (in particular propylene glycol); further details of this boiler will be provided below;

a condensation device 9 having an inlet for steam and an outlet for water; this device is adapted to produce condensation of the steam and can be formed, for example, by a cooling coil and by a small collection vessel;

a hydraulic valve 10 having an inlet and an outlet; this valve is advantageously an electrically operated hydraulic valve (electric valve or solenoid valve) for example of the plunger type; the purpose of this valve is to open/close a hydraulic circuit CKT to heat the fluids separating filter 5; further details of this hydraulic circuit will be provided below;

a cooling device 11 having an inlet and an outlet and adapted to cool a water flow passing through it;

a fluids separating filter 12 operating by flow and float having an inlet and an outlet; this filter is the same as or similar to the fluids separating filter 5;

a device for adding mineral salts 13 having an inlet and an outlet; this device is adapted to add mineral salts to the water flow passing through it;

an output tank 14 for water having an inlet and an outlet; this output tank is adapted to accumulate a certain quantity of water made drinkable by the water purifier; this tank is a box-shaped vessel (easily washable); this tank can be refrigerated in a manner such that cooled water can be supplied at the outlet of the water purifier of FIG. 1;

a hydraulic valve 15 having an inlet and an outlet; this valve is advantageously a manually operated hydraulic valve, for example of the butterfly type; the purpose of this valve is to empty the boiler 8 and to drain any undesirable elements (such as solid residues) that have accumulated in the boiler.

The water purifier of FIG. 1 also comprises a microprocessor control unit adapted to control the electric devices thereof, for example the pump 3, the pump 6 and the valve 10 on the basis of electric signals received by sensors present in the water purifier, in particular in its components (e.g., the sensors in the boiler 8), and of electric signals received by the user interface device (e.g., push buttons)—none of this is shown in FIG. 1.

The components listed above are connected from a hydraulic point of view as described below:

(input tank 1) the inlet I leads directly into the tank 1 and the outlet of the tank 1 is connected to the inlet of the filter 2;

(mechanical filter 2) the inlet of the filter 2 is connected to the outlet of the tank 1 and the outlet of the filter 2 is connected to the inlet of the pump 3;

(electric pump 3) the inlet of the pump 3 is connected to the outlet of the filter 2 and the outlet of the pump 3 is connected to the inlet for the water flow to be heated of the heat exchanger 4;

(heat exchanger 4) the inlet for the water flow to be heated of the heat exchanger 4 is connected to the outlet of the pump 3, the outlet for the water flow to be heated of the heat exchanger 4 is connected to the inlet of the filter 5, the inlet for the water flow to be cooled of the heat exchanger 4 is connected to the outlet for the water flow to be cooled of the heat exchanger 7, the outlet for the water flow to be cooled of the heat exchanger 4 is connected to the inlet of the device 11;

(fluids separating filter 5) the inlet of the filter 5 is connected to the outlet for the water flow to be heated of the heat exchanger 4 and the outlet of the filter 5 is connected to the inlet of the pump 6;

(electric pump 6) the inlet of the pump 6 is connected to the outlet of the filter 5 and the outlet of the pump 6 is connected to the inlet for the water flow to be heated of the heat exchanger 7;

(heat exchanger 7) the inlet for the water flow to be heated of the heat exchanger 7 is connected to the outlet of the pump 6, the outlet for the water flow to be heated of the heat exchanger 7 is connected to the inlet of the boiler 8, the inlet for the water flow to be cooled of the heat exchanger 7 is connected to the outlet of the device 9, the outlet for the water flow to be cooled of the heat exchanger 7 is connected to the inlet for the water flow to be cooled of the heat exchanger 4;

(boiler 8) the inlet of the boiler 8 is connected to the outlet for the water flow to be heated of the heat exchanger 7 and the outlet of the boiler 8 is connected to the inlet of the device 9;

(condensation device 9) the inlet of the device 9 is connected to the outlet of the boiler 8 and the outlet of the device 9 is connected to the inlet for the water flow to be cooled of the heat exchanger 7;

(hydraulic valve 10) the inlet of the valve 10 is connected to the outlet of the device 9 and the outlet of the valve 10 is connected to the hydraulic circuit CKT;

(cooling device 11) the inlet of the device 11 is connected to the outlet for the water flow to be cooled of the heat exchanger 4 and the outlet of the device 11 is connected to the inlet of the filter 12;

(fluids separating filter 12) the inlet of the filter 12 is connected to the outlet of the device 11 and the outlet of the filter 12 is connected to the inlet of the device 13;

(device for adding mineral salts 13) the inlet of the device 13 is connected to the outlet of the filter 12 and the outlet of the device 13 is connected to the inlet of the tank 14;

(output tank 14) the inlet of the tank 14 is connected to the outlet of the device 13 and the outlet of the tank 14 is connected to the drinkable water outlet O1;

(hydraulic valve 15) the inlet of the valve 15 is connected to the inlet of the boiler 8 (below) and the outlet of the valve 15 is connected to a drain O3.

FIG. 2 shows, according to three different views (FIG. 2A is a top view, FIG. 2B is a vertical sectional view according to the section A-A, FIG. 2C is a vertical sectional view according to the section B-B), an embodiment of a fluids separating filter operating by flow and float that can be used as filter 5 in the water purifier of FIG. 1.

This filter has an inlet IN and an outlet OT and comprises eight chambers C1, C2, C3, C4, C5, C6, C7, C8 connected hydraulically in series; the chamber C1 is connected to the inlet IN which finishes very close to the bottom of the chamber C1; the chamber C8 is connected to the outlet OT which starts very close to the bottom of the chamber C8.

This filter is enclosed by a box-shaped element and has seven inner walls W1, W2, W3, W4, W5, W6, W7 substantially vertical; the wall W4 separates the chambers C1, C2, C3 and C4 from the chambers C5, C6, C7 and C8, the wall W1 separates the chamber C1 from the chamber C2, the wall W2 separates the chamber C2 from the chamber C3, the wall W3 separates the chamber C3 from the chamber C4, the wall W5 separates the chamber C5 from the chamber C6, the wall W6 separates the chamber C6 from the chamber C7, the wall W7 separates the chamber C7 from the chamber C8.

At the bottom, this filter has two inclined surfaces IP1 and IP2 (the inclination thereof is slight, e.g. 10°-15°); the inclined surface IP1 forms the bottom of the chambers C1, C2, C3 and C4; the inclined surface IP2 forms the bottom of the chambers C5, C6, C7 and C8.

In general, the chambers are in mutual communication by means of meandrous paths M12, M23, M34, M56, M67, M78 in the bottom area of these chambers; only the chambers C4 and C5 are in mutual communication by means of a gap SL that extends for the total height thereof.

These meandrous paths are produced in the following way; the substantially vertical inner walls do not reach the bottom of the chambers, but leave a lower gap open; before each wall there is a barrier that extends in a substantially vertical direction for a height slightly greater than the height of the gap.

The configuration of the filter of FIG. 2 is such that the fluid flow takes place in a thin area adjacent to the bottom of the chambers, i.e. to the two inclined surfaces, the speed of the flow is very low, and the elements lighter than water present in the flow are pushed upward towards the upper area of the filter, the volatile elements are delivered from the filter in gaseous phase and the liquid elements can be delivered from the filter through an optional overflow drain, not shown in the figure (therefore it can also be said that this filter operates by flow and gravity).

The efficiency of this filter is greater if the water that flows through it and that is filtered by it is hot; this is the reason for which the heat exchanger 4 is provided; moreover, for the same purpose, the filter of FIG. 2 is advantageously provided with a separate hydraulic heating path (i.e., a coil), not shown in the figure, the purpose of which is to heat all or part of the walls of the filter and/or the fluid while it flows therethrough.

The purpose of the valve 10 is to open/close the hydraulic circuit CKT which comprises the hydraulic heating path of the filter 5; the circuit CKT (see FIG. 1) begins downstream of the valve 10, passes through the filter 5 and ends downstream of the device 9 and upstream of the heat exchanger 7; typically, the circuit CKT is closed (i.e., there is fluid flow) at the beginning of the operation of the water purifier when the heat exchanger 4 is unable to heat the water sent to the filter 5 sufficiently and is opened (i.e. there is no fluid flow) after a certain time (e.g., after 5-10 minutes) when it is no longer required; in this way, the filter 5 starts to be effective sooner (e.g., after only a few minutes).

A water purifier such as the one of FIG. 1 (or a similar purifier) through a filter such as the one of FIG. 2 (or a similar filter) is able to effectively remove the non-drinkable elements present in the water that is in the tank 1 and to supply drinkable water at the outlet O1.

With regard to large solid particles (e.g., gravel), these are blocked in the tank 1, due to the meandrous path thereof and to the fact that the outlet is raised from the bottom (making use of gravity); periodically, it will be necessary to remove them from the tank by emptying and washing the vessel.

With regard to the small solid particles (e.g., sand) these are blocked partly in the tank 1, due to the meandrous path thereof and to the fact that the outlet is raised from the bottom (making use of gravity), and partly in the filter 2 (making use of the small dimensions of holes and/or pores); periodically, it will be necessary to remove them by emptying and washing the vessel of the tank 1 and the walls of the filter 2 and, if necessary, replacing the walls made of porous paper. Any small solid particles that pass through both the tank 1 and the filter 2 are blocked in the boiler 8; in fact, during boiling, if sufficient liquid is present, these solid particles do not leave the liquid phase; periodically, it will be necessary to remove them by emptying and washing the vessel of the boiler 8.

With regard to heavy metals, these are blocked in the boiler 8; in fact, during boiling, if sufficient liquid is present, these heavy elements do not leave the liquid phase; periodically, it will be necessary to remove them by emptying and washing the vessel of the boiler 8.

With regard to hydrocarbons and detergents, these are mainly blocked by the filters 5 and 12, but also the boiler 8 has a positive inflow. Hydrocarbons and detergents are lighter than water and the separating filters operating by flow and float separate them well from the water; as already stated, a high temperature (e.g., 40-50° C.) promotes separation. Volatile hydrocarbons and detergents leave the liquid phase and enter the filters 5 and 12 in gaseous phase; non-volatile hydrocarbons and detergents float to and remain on the surface and can mainly flow out through the optional overflow drain O2. However, it will be necessary periodically to remove them completely by emptying and washing the filters 5 and 12.

With regard to fertilizers, these are blocked in the boiler 8.

With regard to hydrazine and ammonia, these are blocked by the filters 5 and 12 and in the boiler 8, being substances that decompose with heat and that are partly volatile.

With regard to bacteria, microbes and viruses, these are killed due to the high temperature present in the boiler 8 (typically 110-130° C.).

The filters 5 and 12 are effective both in relation to light substances and in relation to volatile substances, as they operate by flow and float. Nonetheless, it should be observed that the filter 5 has the main task of eliminating substances of lower density (hence which float) and therefore the level of the liquid therein must be relatively high (e.g., 4-10 mm), while the filter 12 has the main task of eliminating the volatile substances and therefore the level of liquid therein must be relatively low (e.g., 2-5 mm). Moreover, to improve the effectiveness of the filter 12, it is useful for the bottom thereof to be made in steps of very low height (e.g., 1-2 mm).

From what has been stated, it is understood that the system according to the present invention is not only of simple construction and effective in producing drinkable water of excellent quality, but is also very easy to maintain: in fact, substantially the only operation to be carried out periodically is washing of its components (this operation can be carried out in particular using the drinkable water produced by the system). Moreover, there are no components or parts thereof to replace; in other words there are no consumable materials.

With regard to acids, the system of FIG. 1 (or a similar system) is able to reduce the content thereof in the water, also to block these simply and effectively, basic salts that neutralize them can be added to the tank 1; this addition can be implemented when required after having detected the pH of the liquid present in the vessel of the tank 1; the pH can be detected simply using widely known level indicator strips that change color depending on the pH of the liquid in which they are immersed.

With regard to salts such as sodium chloride and magnesium chloride (e.g., present in sea water), these are effectively blocked in the boiler 8. However, if it is necessary to treat large quantities of sea water, a preliminary stage, adapted to carry out desalination (removal of salt) of the water, can be provided.

The water purifier of FIG. 1 is typically provided with an input tank 1 adapted to contain around 10-20 liters of non-drinkable water and an output tank 14 adapted to contain 3-5 liters of drinkable water; in fact, it is preferable for the drinkable water not to be stored for any length of time before use to prevent microorganisms from developing therein. During operation at full capacity, 1 liter/hr of water circulates in the water purifier of FIG. 1. If the ambient temperature is around 20° C., then the temperatures in the various points of the system are typically the following: 20° C. in I, 20° C. in A, 20° C. in B, 45° C. in C, 45° C. in D, 45° C. in E, 70° C. in F, 120° C. in G, 95° C. in H, 70° C. in J, 45° C. in K, 30° C. in L, 28° C. in M, 26° in N, 20° C. in O1; the temperature in the boiler 8 reaches 110-130° C. At the beginning of operation (the first 5-10 minutes), the first 0.5 l of water treated in by the system are not totally drinkable.

It is evident that a water purifier such as that of FIG. 1 (or a similar purifier) achieves the objects proposed by the present invention.

The water purifier of FIG. 1 can be modified and/or integrated in various ways.

It is possible to omit an integrated output tank (such as the tank 14) and to use an external container; it is possible to omit a device for the addition of mineral salts (such as the device 13) and to make do with drinkable water with a less pleasant taste; it is possible to omit the hydraulic circuit CKT and wait for a greater time and discard the water produced at the beginning; the position of the device 11 and of the filter 12 can be reversed in relation to those shown in FIG. 1.

In addition to what is shown in FIG. 1, a device for the addition of carbon dioxide in a manner such that sparkling water is delivered through the water purifier outlet and/or a refrigerating device in a manner such that cooled water is delivered through the water purifier outlet, can be provided immediately upstream of the outlet O1.

To make the water purifier of FIG. 1 safer and automatic, a hydraulic circuit can be provided, adapted to prevent water from being delivered through the outlet at selected times, preferably at the beginning of the operation thereof; in this way, it is not possible for water that is not perfectly drinkable to be supplied through the outlet; this circuit can be produced by means of a hydraulic diverter valve adapted to send the water flow alternatively towards the drinkable water outlet or towards a drain or the input tank 1; with reference to the example of FIG. 1, this diverter valve could advantageously be arranged immediately upstream of the device 13 or immediately downstream of the heat exchangers 4 or 11.

The water purifier of FIG. 1 is suitable to be supplied totally or almost totally by means of solar energy.

With regard to the electric devices such as the pumps 3 and 6, the valve 10 and the electronic control unit (with all its sensors and actuators), these can be supplied by a battery, by an accumulator, by a few photovoltaic solar cells or by a small wind electric generator as they require low electric power (20-30 W); moreover, the accumulator could be charged by the photovoltaic solar cells or by the wind electric generator.

With regard to the boiler 8 (which consumes considerable energy to heat and boil the water), this can receive energy by means of a flow of a hot fluid (such as water or glycol) coming from a thermal-hydraulic solar panel (not shown in FIG. 1).

Naturally, many variants or additions to the system described above are possible.

For example, although this is not strictly necessary, one or more filters (sand filter, activated charcoal filter, multi-cartridge filter, filter with reverse osmosis or nanofiltration membrane, resin filter) and/or a UV ray sterilizer can be added. An activated charcoal filter could be arranged in particular upstream of the inlet for the first flow of the heat exchanger and used to reduce an excess of hydrocarbons and/or of volatile components.

Moreover, one or more devices for the addition of solid or liquid substances can be provided in the water purifier, for example in the vicinity of the drinkable water outlet thereof.

Finally, it should be considered that the purpose of the first heat exchanger is to increase the temperature of the non-drinkable water supplied to the first fluids separating filter and thus maximize the effectiveness of this filter; this thermal effect could also be omitted or achieved in an equivalent way.

According to a particularly advantageous variant of the embodiment of FIG. 1, the filter 12 can be arranged directly downstream of the condensation device 9; e.g., it could be integrated in the heat exchanger 7. In this way, this filter 12 will operate with liquid at high temperature and therefore further promote final elimination of the volatile components, which will have been already partly eliminated by the filter 5 operating at a lower temperature.

This variant fundamentally has five elements: a separating filter (operating by flow and float) that operates at relatively low temperature (e.g., 45-80° C. and preferably 65-75° C.), a boiler with mass presence of liquid (at a predetermined level or in a predetermined interval of levels) that operates at high temperature (110-130° C.), a condenser, a separating filter (operating by flow and float) that operates at relatively high temperature (e.g., 70-95° C. and preferably 80-90° C.), and at least one heat exchanger to recycle the heat deriving from boiling.

The filter of FIG. 2 embodies a solution of separating filter that itself has an innovative value notwithstanding its use in the water purified described and claimed herein.

It must be noted that the filter of FIG. 2 (which is represented schematically and not in scale) can be modified from many points of view, for example: the barriers that are raised from the bottom can also be arranged separately from the arrangement of the inner walls of the chambers (e.g., with a different frequency), a stepped bottom can be provided instead of the barriers, a part of the bottom can be stepped and a part of the bottom can be flat and inclined, the inner walls can be slightly oblique instead of vertical, the filter can be provided with one or with three sections instead of two, . . . .

The essential technical features of this filter solution are:
operation by flow and float, and
operation at high temperature.

This high temperature can be selected, for example, in the interval 45-95° C. and preferably in the interval 65-75° C.; to achieve it, heating means integrated in the filter or heating means downstream of the filter can be provided; these heating means can, for example, be of electric type (in the water purifier of FIG. 1 they are of hydraulic type).

Further advantageous technical features of this solution of filter are:
use of one or more meandrous paths (in vertical and/or horizontal direction) which decrease the speed of the flow and thus promote precipitation of heavy substances and rising of light and volatile substances, and/or
use of stepped walls (the steps can be produced also by means of simple barriers that project from a flat wall) which promote laminar flow of the liquid, and/or
differentiated depth of the liquid in the filter: relatively small to promote expulsion of the volatile substances, relatively large to promote separation of the light and heavy substances, and/or
covering of the inner surfaces of the filter in washable material, in particular Teflon.

Due to these technical features, the filter is able to effectively remove undesirable volatile substances from the water, in particular chlorine, undesirable light and largely insoluble substances, in particular oily substances, and undesirable heavy and largely insoluble substances, in particular calcium carbonate (commonly called "limescale"); moreover, it reduces the bacterial load of the water.

The filter is therefore very suitable to be used, for example, upstream of, or integrated in, machines for preparation of hot beverages (e.g., coffee machines) and machines for steam pressing of garments. Moreover, its low production, maintenance and running cost makes it particularly suitable for these uses.

We claim:

1. A water purifier comprising:
   an input tank (1) for containing a quantity of non-drinkable water to be purified, said input tank having an outlet;
   a first heat exchanger (4) having a first outlet and a first inlet, said first inlet being fluidically coupled with said outlet of said input tank;
   a separation apparatus (5) comprising one or more vertical and/or horizontal meandrous fluid flow paths, and having an inlet fluidically coupled with said first outlet of said first heat exchanger for introduction of the quantity of non-drinkable water to be purified, said separation apparatus including an outlet;
   a pump (6) having an inlet fluidically coupled with the outlet of said separation apparatus, and further including an outlet;
   a second heat exchanger (7) having an inlet fluidically coupled with said outlet of said pump, and further including an outlet;
   a boiler (8) having a water inlet and a steam outlet, the steam outlet being fluidically coupled with a second inlet in said second heat exchanger, said water inlet being fluidically coupled with said outlet of said second heat exchanger.

2. The water purifier of claim 1, further comprising a second separation apparatus, having an inlet and an outlet, and wherein said inlet of the second separation apparatus is fluidically coupled to a second flow outlet of the first heat exchanger or to the steam outlet of the boiler upstream of said first heat exchanger and said outlet of the second separation apparatus is fluidically coupled to a drinkable water outlet.

3. The water purifier of claim 1, further comprising at least one hydraulic device chosen from the group comprising a device for adding mineral salts, a device for adding carbon dioxide, a device for adding solid or liquid substances, a refrigerating device, an output tank, said at least one hydraulic device being arranged immediately upstream of a drinkable water outlet.

4. The water purifier of claim 1, further comprising one or more electric devices, said one or more electric devices controlling fluid flows in the water purifier, and photovoltaic solar cells or a wind electric generator electrically coupled to said one or more electric devices for the purpose of supplying electric power thereto.

5. The water purifier of claim 1, further comprising a hydraulic circuit (CKT) connected to said separation apparatus and capable of providing heating of said separation apparatus at selected times.

6. The water purifier of claim 1, further comprising a valve capable of preventing water from flowing through a drinkable water outlet at selected times.

7. The water purifier of claim 1, wherein said boiler includes a sensor to detect a level of water therein.

8. The water purifier of claim 7, further comprising an electronic control unit connected to said sensor and arranged to maintain liquid water in said boiler at a predetermined level or in an interval of predetermined levels.

9. The water purifier of claim 1, wherein said boiler includes a sensor to detect a pressure of steam therein.

10. The water purifier of claim 1, wherein said boiler includes a sensor to detect a temperature of water therein.

11. The water purifier of claim 4, further comprising electric devices, sensors and an electronic control unit controlling said electric devices on the basis of electric signals received by said sensors.

12. The water purifier of claim 1, wherein the separation apparatus is capable of operating at a temperature in the interval 45-95° C.

13. The water purifier of claim 1, wherein the separation apparatus integrates a hydraulic heater.

14. The water purifier of claim 1, wherein the separation apparatus comprises a plurality of stepped walls promoting laminar flow of a liquid.

15. The water purifier of claim 1, wherein the separation apparatus has a differentiated depth to promote separation of substances.

16. The water purifier of claim 1, wherein one or more inner surfaces of the separation apparatus are covered in a washable material.

17. The water purifier of claim 1 further comprising a mechanical filter between said input tank and said separation apparatus, said mechanical filter having at least one wall being made of a porous paper having a plurality of holes or pores.

* * * * *